United States Patent
Schuss et al.

(10) Patent No.: US 12,372,613 B2
(45) Date of Patent: Jul. 29, 2025

(54) RX AND TX COHERENCE IN RADAR ANTENNA USING NEAR FIELD ANTENNA

(71) Applicant: Raytheon Company, Waltham, MA (US)

(72) Inventors: Jack J. Schuss, Newton, MA (US); Joseph E. Hilliard, Jr., Chelmsford, MA (US)

(73) Assignee: Raytheon Company, Arlington, VA (US)

( * ) Notice: Subject to any disclaimer, the term of this patent is extended or adjusted under 35 U.S.C. 154(b) by 345 days.

(21) Appl. No.: 18/149,831

(22) Filed: Jan. 4, 2023

(65) Prior Publication Data

US 2024/0219520 A1     Jul. 4, 2024

(51) Int. Cl.
*G01S 7/40*     (2006.01)

(52) U.S. Cl.
CPC .......... *G01S 7/4008* (2013.01); *G01S 7/4021* (2013.01)

(58) Field of Classification Search
CPC ........... G01S 2013/0245; G01S 7/4008; G01S 7/4021; H01Q 3/267
See application file for complete search history.

(56) References Cited

U.S. PATENT DOCUMENTS

| | | | |
|---|---|---|---|
| 9,705,611 B1 * | 7/2017 | West | H01Q 3/267 |
| 9,979,084 B2 | 5/2018 | Sikina et al. | |
| 2016/0043465 A1 * | 2/2016 | McDevitt | G01S 13/91 |
| | | | 342/368 |
| 2020/0227824 A1 * | 7/2020 | Abdalla | H04B 17/12 |
| 2021/0405103 A1 | 12/2021 | Salazar Cerreno | |

FOREIGN PATENT DOCUMENTS

| | | |
|---|---|---|
| CN | 102176546 B | 9/2013 |
| CN | 209 046 650 U | 6/2019 |

OTHER PUBLICATIONS

Li, "A Simple and Efficient On-Board Calibration Method of Satellite Phased Array Antenna;" Proceedings of the 2017 International Applied Computational Electromagnetics Society Symposium (ACES), Applied Computational Electromagnetics Society; Aug. 1, 2017; 2 Pages.

(Continued)

*Primary Examiner* — Timothy X Pham (57) ABSTRACT

Method and system of calibrating and cohering at least one radar antenna in receive (RX) mode and transmit (TX) mode, comprising performing RX mode calibration on at least one radar antenna using radio frequency (RF) far field calibration source, determining RF phase $\varnothing_{RX_n}$ using RF far field calibration source for each at least one radar antenna, operating at least one radar antenna in RX mode with at least one near field antenna to determine plurality of RX mode phases in at least one radar antenna and at least one near field antenna, operating at least one radar antenna in TX mode with at least one near field antenna to determine plurality of TX mode phases in at least one radar antenna and at least one near field antenna, and deriving TX mode calibration phases as function of determined RX mode phases and determined TX mode calibration phases.

20 Claims, 6 Drawing Sheets

(56) References Cited

OTHER PUBLICATIONS

PCT International Search Report and Written Opinion dated Dec. 15, 2023 for International Application No. PCT/US2023/074547; 15 Pages.
Office Action and Search Report dated Jan. 6, 2025 in connection with Taiwanese Patent Application No. 112137026, 12 pages.
Martin et al., "Large Reflector Uplink Arraying;" SpaceOps 2010 Conference, Hosted by NASA Mars; Apr. 25-30, 2010; 16 Pages.

* cited by examiner

- $\emptyset_{RXn}$ = rf phase from SatCal reference plane of dish antenna n to RX rf port of dish antenna n; measured during RX SatCal
  = $\Delta\emptyset_{RXn} + \Delta\phi$
- $\emptyset_{TXn}$ = rf phase from SatCal reference plane of dish antenna n to TX rf port of dish antenna n; to be determined
  = $\Delta\emptyset_{TXn} + \Delta\phi$
- $\emptyset_{TXn} - \emptyset_{RXn} = \Delta\emptyset_{TXn} - \Delta\emptyset_{RXn}$

RX AND TX COHERENCE IN RADAR ANTENNA USING NEAR FIELD ANTENNA

BACKGROUND

It is difficult and expensive to install a large radar antenna in a remote location. A large radar antenna requires a large building or facility and must undergo an extended period of installation, integration, and testing prior to operation. Thus, transportability of a large radar antenna is very limited. Alternately, several smaller radar antennas may be transported to a remote location. Such smaller radar antennas must then be cohered in both receive (RX) mode and transmit (TX) mode to achieve the functionality of a large radar antenna. The result is a capability to rapidly transport and site the functionality of a large radar antenna at a remote location with a reduced cost. Critical to this concept is the necessity to cohere the smaller radar antennas to each other. Otherwise, system sensitivity will be strongly degraded. U.S. Pat. No. 9,979,084, which is incorporated herein by reference, discloses a method of cohering multiple radar antennas in RX mode using satellite calibration (SatCal). However, TX mode coherence is more difficult and complex to accomplish.

A deep space radar antenna requires large arrays of dish antennas spread over a distance of approximately 1 km. Such dish antennas must be calibrated and properly phased in order to cohere their radiated radio frequency (RF) waves or to have their receive signals combine in phase (in coherence). Without coherence, a radar antenna will not function properly. Calibration in RX mode has been demonstrated but achieving TX coherence is more complicated and has not been demonstrated without requiring RF far field calibration sources.

SUMMARY

In accordance with the concepts described herein, exemplary methods and systems provide TX coherence for a radar antenna.

In accordance with the concepts described herein, exemplary methods and systems provide a near field horn calibration method to cohere together in TX multiple, independent radar antennas in the field.

In accordance with the concepts described herein, exemplary methods and systems provide a radar antenna that is transportable to a remote site.

In accordance with the concepts described herein, exemplary methods and systems provide enable a radar antenna to be physically detached and rapidly transported and instantiated as a cohered radar network.

DESCRIPTION OF THE DRAWINGS

The manner and process of making and using the disclosed embodiments may be appreciated by reference to the figures of the accompanying drawings. It should be appreciated that the components and structures illustrated in the figures are not necessarily to scale, emphasis instead being placed upon illustrating the principals of the concepts described herein. Like reference numerals designate corresponding parts throughout the different views. Furthermore, embodiments are illustrated by way of example and not limitation in the figures, in which.

DETAILED DESCRIPTION

The present disclosure provides an exemplary method and system to rapidly achieve large aperture radar performance at remote locations, where autonomous radar antennas are not mechanically anchored to each other. Instead, the autonomous radar antennas are cohered in both RX mode and TX mode with a near field antenna.

Large radar antenna apertures and performance may be obtained by cohering together many smaller, transportable radar antennas in the field. Phase centers of radar antennas (e.g., active array radar antennas or dish antennas) must be known in order to fully steer a TX beam. Phases of orthogonal waveforms must be related to that of a common radar waveform in order to recover full $20 \log_{10}(N)$ effective isotropic radiated power (EIRP), where N is number of TX antennas.

TX calibration of multiple dish antennas may be achieved using satellite radar targets (e.g., RF far field calibration sources). In order to calibrate using satellite targets, one must know which satellites are within an area of the sky being surveyed. One must also accurately know the TX antenna phase centers. In addition, a sequence of measurements must be accomplished in which each TX antenna radiates an orthogonal waveform, in addition to a common waveform utilized by all TX antennas during radar operation. Such methods are complex and time consuming. Other methods involve mechanically combining radar arrays into one large aperture, which, in many cases, is not possible.

An exemplary method (e.g., a method for both RX mode and TX mode calibration) of the present disclosure leverages both RX operations and TX operations of each radar antenna being calibrated. RX calibration and antenna phase centers may be quickly determined using an RX calibration method (e.g., SatCal, but any suitable RX calibration method may be used). A one step TX calibration process follows from an RX calibration using a near field RF antenna (e.g., a horn antenna or a dish antenna with a feed horn). A feed horn is a small horn antenna used to couple a waveguide to a dish antenna (e.g., a parabolic dish antenna or an offset dish antenna) for reception or transmission of a microwave signal. The result is a solution to a problem limiting the application of large radar antennas (e.g., large, phased array antennas or dish antennas) at remote locations.

There are a number of ways to combine several radar antennas into one system including: (1) coherently combining RX and incoherently combining TX signals, and; (2) coherently combining all RX and TX signals. In incoherent combining, a signal-to-noise ratio (SNR) of an array of radar antennas increases as $20 \log_{10} N$, where N is the number of radar antennas combined, and coherence is only in RX mode. In coherently combining RX and TX, SNR increases as $30 \log_{10} N$, where N is the number of radar antennas combined. Net improvement of RX and TX coherence versus only RX coherence is $10 \log_{10} N$. Coherent combining RX and TX is a method of obtaining maximum large aperture radar performance using multiple smaller aperture radar antennas.

Figure 1:
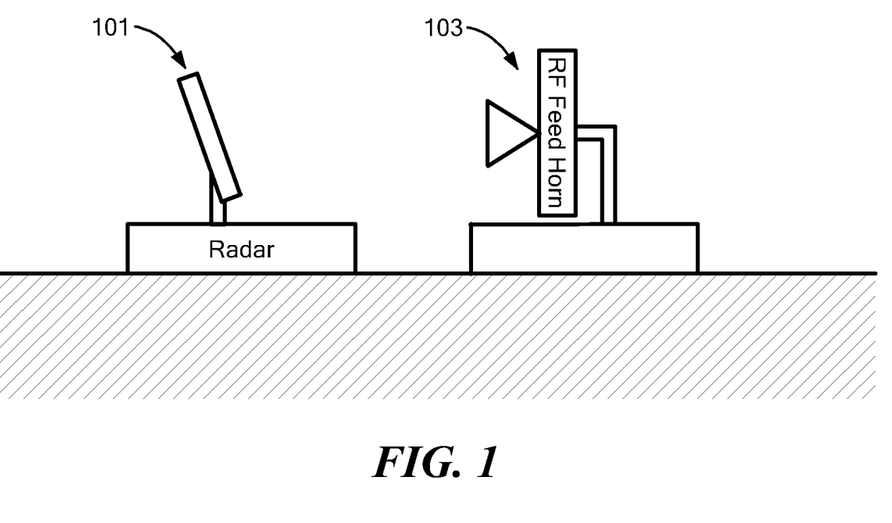
FIG. 1 is an illustration of an active array radar antenna being calibrated using a near field horn antenna according to the present disclosure.

FIG. 1 is an illustration of at least one active array radar antenna 101 being TX calibrated by at least one near field horn antenna 103 according to the present disclosure. In an exemplary embodiment, one near field horn antenna 103 may be used to TX calibrate each of the at least one active array radar antenna 101 by moving the near field horn antenna 103 to each location of the at least one active array radar antenna 101. In an exemplary embodiment, more than one near field horn antenna 103 (e.g., at least two, a number equal to the number of active array radar antennas 101, or a number greater than the number of active array radar antennas 101) may be used to TX calibrate the at least one active array radar antenna 101 by moving and/or arranging the near field horn antennas 103 with respect to the locations of the at least one active array radar antenna 101. The relative calibration factors resulting from multiple near field horn antennas may be determined and compensated for by comparing the resulting calibration factors of the multiple near field horn antennas when the multiple near field horn antennas calibrate a single, common active array radar antenna.

Figure 2:
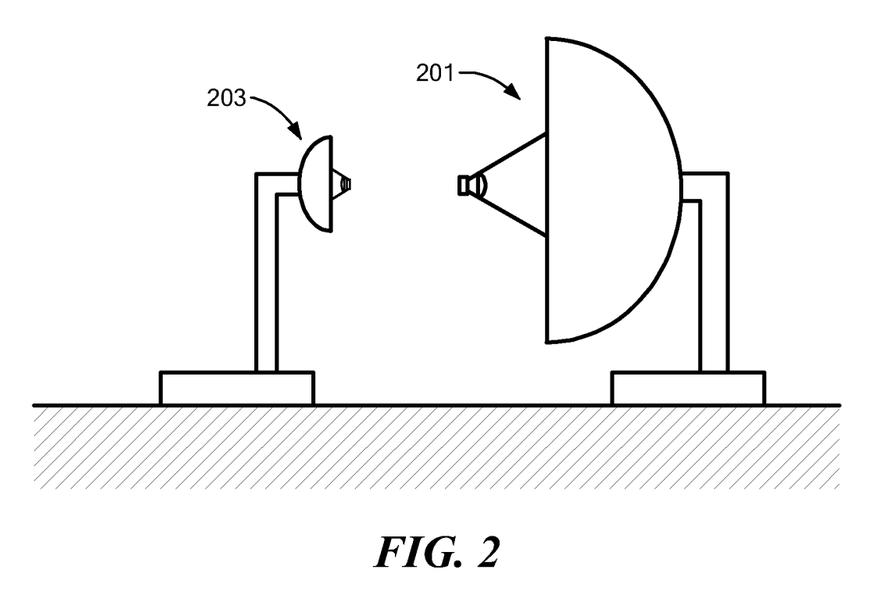
FIG. 2 is an illustration of a dish antenna being calibrated using a near field dish antenna with a feed horn according to the present disclosure.

FIG. 2 is an illustration of at least one dish radar antenna 201 being TX calibrated using at least one near field dish antenna 203 with a feed horn according to the present disclosure. In an exemplary embodiment, one near field dish antenna 203 may be used to TX calibrate each of the at least one dish radar antenna 201 by moving the near field dish antenna 203 to each location of the at least one dish radar antenna 201, or by pointing the near field dish antenna 203 at each of the at least one dish radar antenna 201. In an exemplary embodiment, more than one near field dish antenna 203 (e.g., at least two, a number equal to the number of dish radar antennas 201, or a number greater than the number of dish radar antennas 201) may be used to TX calibrate the at least one dish radar antennas 101 by moving and/or arranging the near field dish antennas 103 with respect to the locations of the at least one dish radar antennas 101. The relative calibration factors resulting from multiple near field horn antennas may be determined and compensated for by comparing the resulting calibration factors of the multiple near field horn antennas when the multiple near field horn antennas calibrate a single, common active array radar antenna.

An exemplary method of the present disclosure relocates radar antennas at a remote location (e.g., on pre-sunk footings). The radar antennas are interconnected to a common processor and synchronized to a common source (e.g., via a fiber stabilization method and/or a fiber short-open-load (SOL) method).

An exemplary method of radar antenna calibration of the present disclosure comprises calibrating radar antennas (e.g., active array antennas or dish antennas) in RX mode (e.g., using SatCal or any other suitable RX calibration method) and then calibrating the radar antennas in TX mode using orthogonal waveforms for each radar antenna. Optionally, the common waveform for each TX radar antenna may then be calibrated in phase.

Radar antenna calibration in RX mode may be done with a single pulse if SNR is sufficiently high. For example, a geosynchronous equatorial orbit (GEO) satellite with a sufficiently high radar cross section (RCS) may be used for RX calibration if a signal is integrated long enough, and if the transmit radiated power impinging on the satellite is sufficiently high. If an array of radar antennas is utilized for this calibration using only orthogonal waveforms for each radar antenna, there may be a loss of sensitivity of 10 log N relative to using the same waveform and having all TX antennas cohere, where N is the number of TX radar antennas.

Optionally, relative locations of radar antennas may be measured (e.g., using laser retroreflective targets) to assist in RX or TX calibration. While precision measurement of the location of a radar antenna is not required, such a measurement may speed up obtaining TX mode coherence. Multiple radar apertures are aligned and RX mode is cohered (e.g., using SatCal or any other suitable RX mode calibration method). This process may be executed for multiple satellites at multiple angles to refine radar position metrics. A near field antenna (e.g., a horn antenna or a dish antenna with a feed horn) method of the present disclosure may then be used to transfer an RX mode calibration to a TX mode calibration for each radar antenna, to quickly achieve RX mode and TX mode coherence of multiple radar antennas in the field and obtain full $30 \log_{10} N$ radar performance sensitivity.

After RX calibration of all radar antennas is accomplished using a method such as SatCal, and after each radar antenna is calibrated in the TX mode, the one or more near field antenna calibration vehicles may be moved to the next radar antenna to be TX mode calibrated. In an embodiment, only one near field antenna is used to TX calibrate all of the radar antennas. More near field antennas may be used, if so desired, because of a need for redundancy or because a single near field antenna cannot reach or illuminate all radar antennas in a radar antenna farm. In this case, the multiple near field antennas must be used to calibrate at least one common radar antenna. That determines the difference in insertion phase between the near field antenna. This phase correction is then utilized to accurately calibrate radar antennas that were calibrated by using one near field antenna (e.g., near field antenna A) to radar antennas calibrated by another near field antenna (e.g., near field antenna B). Calibration is insensitive to distance between a radar antenna and near field antenna calibration vehicle, sidelobes, etc.

RX mode calibration at a single pointing angle of the radar antennas may be accomplished in one dwell using SatCal, but calibration and coherence of the antennas at multiple pointing angles requires knowledge of the offset or variation of relative radar antenna phase centers as radar antennas are scanned or mechanically pointed. This phase center location may be determined (assuming repeatable radar antenna phase center motions) by RX SatCal at multiple scan angles, or by precision mechanical measurement of antenna locations.

The present disclosure discloses an exemplary method of TX mode calibration that may be quickly executed at low risk using a single polarization or dual polarized, instrumented horn antenna or dish antenna on a tower near a TX radar antenna (hereinafter referred to as RF Test Horn Calibration). RF Test Horn Calibration leverages the following: electromagnetic reciprocity (e.g., coupling from the RF test antenna to a radar antenna n is the same for both an RX operation and a TX operation); use of TX/RX radar antennas; and either a single RF test antenna may be used, or if 2 or more test antennas are used (e.g., for redundancy or blockage), each test antenna must be calibrated. This may be accomplished by calibrating one radar antenna using the at least 2 test antennas.

In a conventional method using an active array radar antenna, each active array radar antenna is calibrated in only RX mode (e.g., using SatCal). This determines a relative phase from a reference plane of an active array radar antenna that may employ digital beamforming (DBF) to a receiver input.

In embodiments, an RF test radar antenna may be set up on a tower and pointed to a radar antenna to be calibrated in TX mode. Polarizations of the radar antenna being calibrated and the RF test antenna should be aligned. Each radar antenna to be calibrated may then be pointed at the RF test antenna and a measurement of phase in both a RX operation and a TX operation may be made. Knowing the RX calibration of the radar antenna being calibrated, the TX phase calibration may then be determined. Only phase calibration is needed in TX mode, as amplitude is usually not adjustable. The present method dramatically reduces risk and complexity of TX calibration.

In the present disclosure, an RX calibration of each radar antenna must be accomplished using an RX calibration method (e.g., SatCal) and temporal stability of TX and RX components must be maintained between an initial RX calibration and the subsequent TX calibration method.

Figure 3:
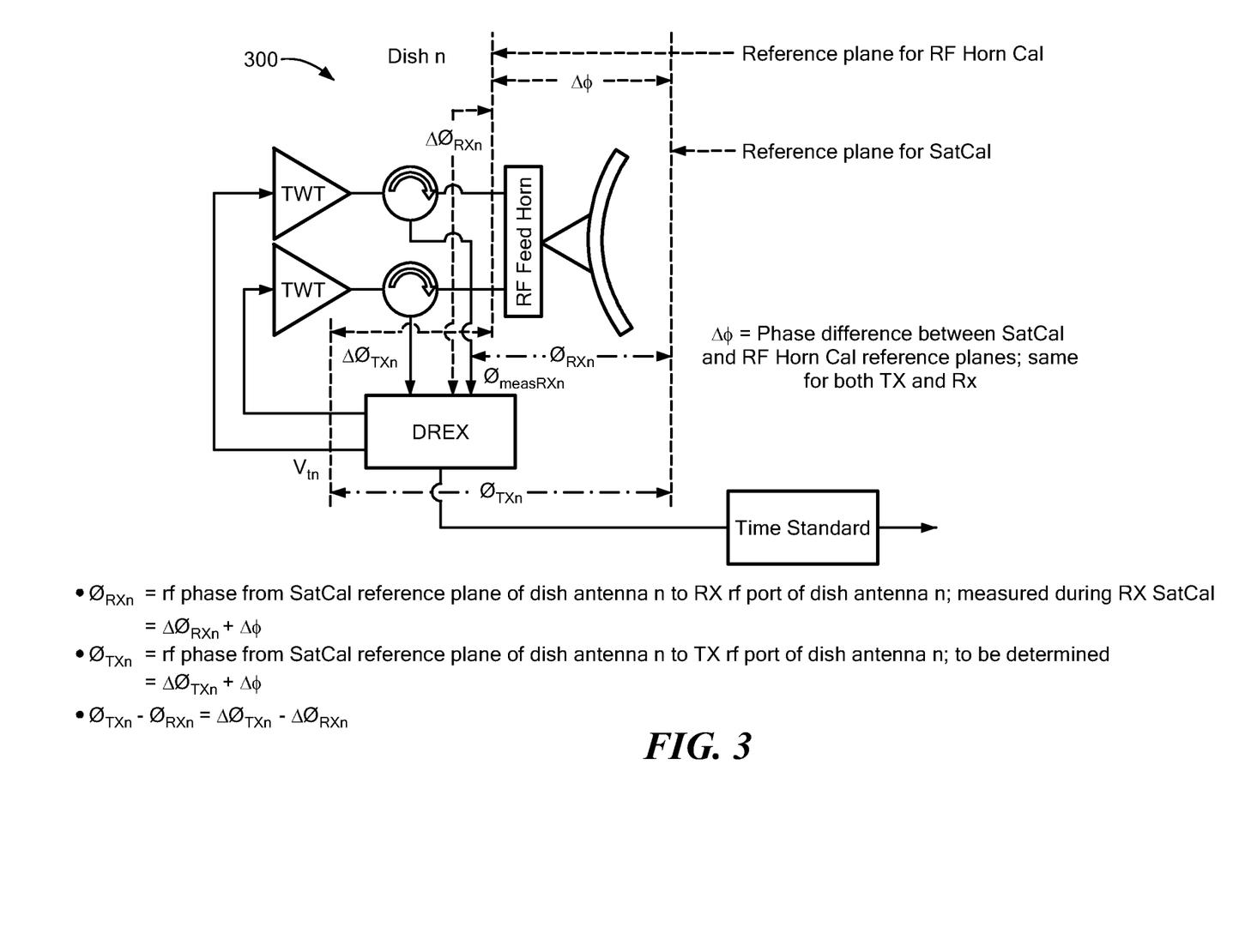
FIG. 3 is an illustration of a dish antenna to be calibrated and phase parameters according to the present disclosure.

FIG. 3 is an illustration of at least one dish antenna 300 to be calibrated and phase parameters according to the present disclosure. FIG. 3 shows that a relationship of a TX phase calibration to an RX phase calibration is the same whether it is measured at a reference plane for RF antenna calibration or a reference plane of an RX calibration method (e.g., SatCal). The TX phase calibration is then accomplished relative to the RX phase calibration for each of the at least one dish antenna 300 by setting a reference plane at a waveguide input to an RF feed horn of the at least one dish antenna 300. This calibration is only as accurate as the RX calibration method (e.g., SatCal), but is independent of multipath errors in the RF horn antenna to Dish n measurements.

The objective of RF Test Horn Calibration is to match a TX mode calibration to a separately executed RX mode calibration. The TX mode calibration may have the same errors, if any, as the RX mode calibration (e.g., SatCal). RX mode calibration may be executed to a reference plane of a plane wave incident at the front of the antenna assembly. The result is the parameter $Ø_{RXn}$. The RF Horn Calibration method determines $Ø_{TXn}$ relative to $Ø_{RXn}$, where $Ø_{TXn}$ is the TX calibration to the same (e.g., arbitrary) reference plane. RF Horn Calibration aligns the TX signal and the RX signal in the at least one dish antenna 300 at the same common TX/RX path element in the at least one dish antenna 300. In this case, a common path element is a horn waveguide feed input. This reference plane may be different than the reference plane for RX calibration (e.g., SatCal).

Typically, temporal stability of the TX and RX components relative to each other may be assured by using a common array calibration receiver/exciter to send calibration signals from the calibration exciter to a coupled path input at each antenna receiver channel and sending an RF signal coupled off of each antenna exciter channel back to the common calibration receiver. A separate method may be used to remove phase drift from the calibration signal cabling. For large distances, RF over fiber may be used to minimize loss in the calibration signal. Calibration data from these coupled paths may be used to apply corrections for any TX or RX phase drift between the time of initial RX calibration and TX calibration by the present RF horn method of the present disclosure.

Example method embodiments achieve their goal because the remaining path elements are common to TX and RX and have the same impact on wave propagation due to electromagnetic (EM) reciprocity. Since the present method utilizes reciprocity at the RF horn input, the present method is not affected by errors such as multipath. Such errors are common to the TX and RX Horn measurements and cancel out.

Figure 4:
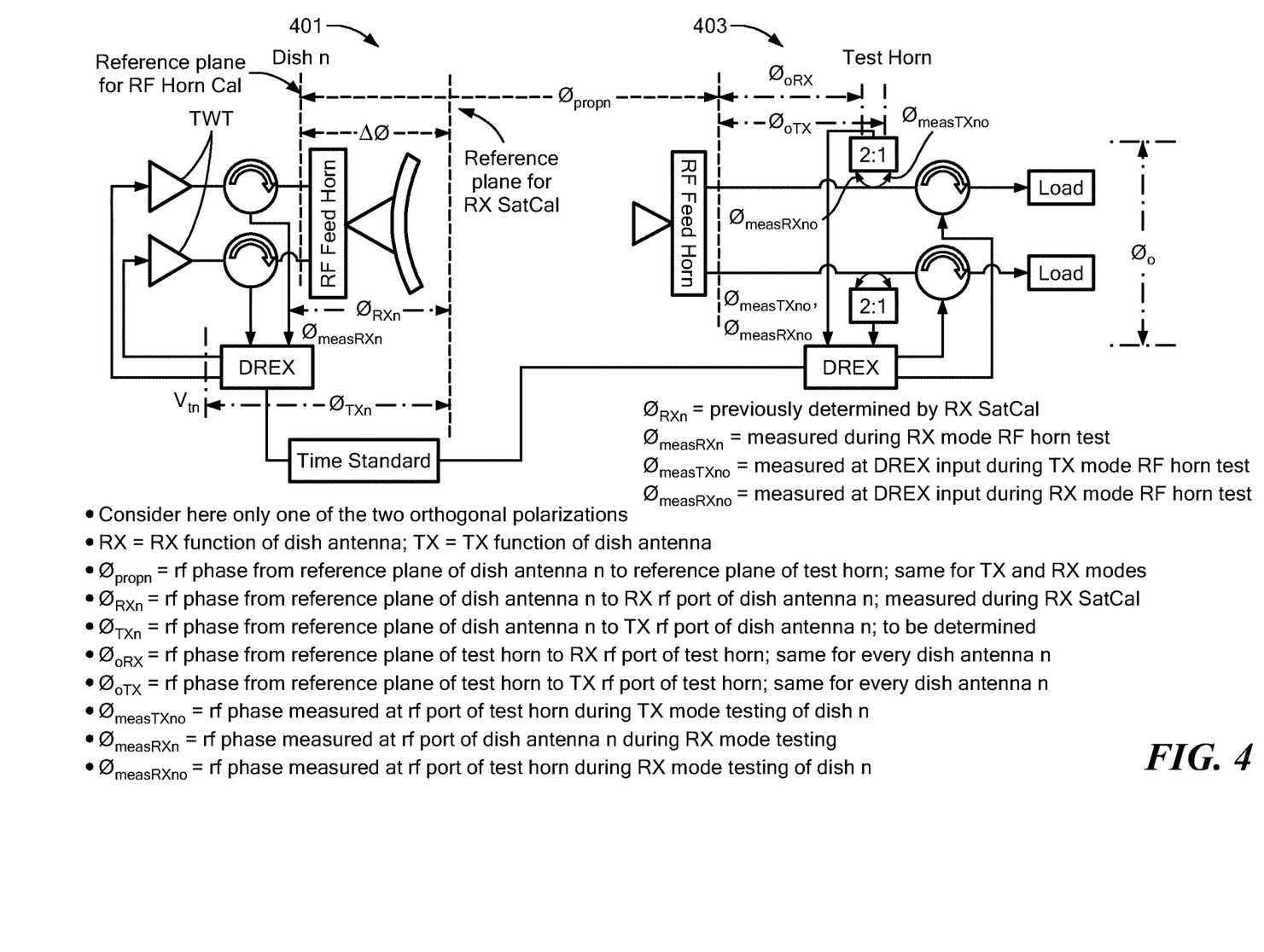
FIG. 4 is an illustration of a dish antenna being calibrated using a near field horn antenna and phase parameters according to the present disclosure.

FIG. 4 is an illustration of at least one dish antenna 401 being calibrated using at least one near field horn antenna 403 and phase parameters according to the present disclosure.

The first step of the Near Field Horn method is calibrating the at least one dish antenna 401 in RX mode using an RX calibration method (e.g., SatCal) to determine $Ø_{RXn}$, where $Ø_{RXn}$ is a RF phase from a RF far field calibration source reference plane of the at least one radar antenna to an RX RF port of the at least one radar antenna in RX mode.

Figure 5:
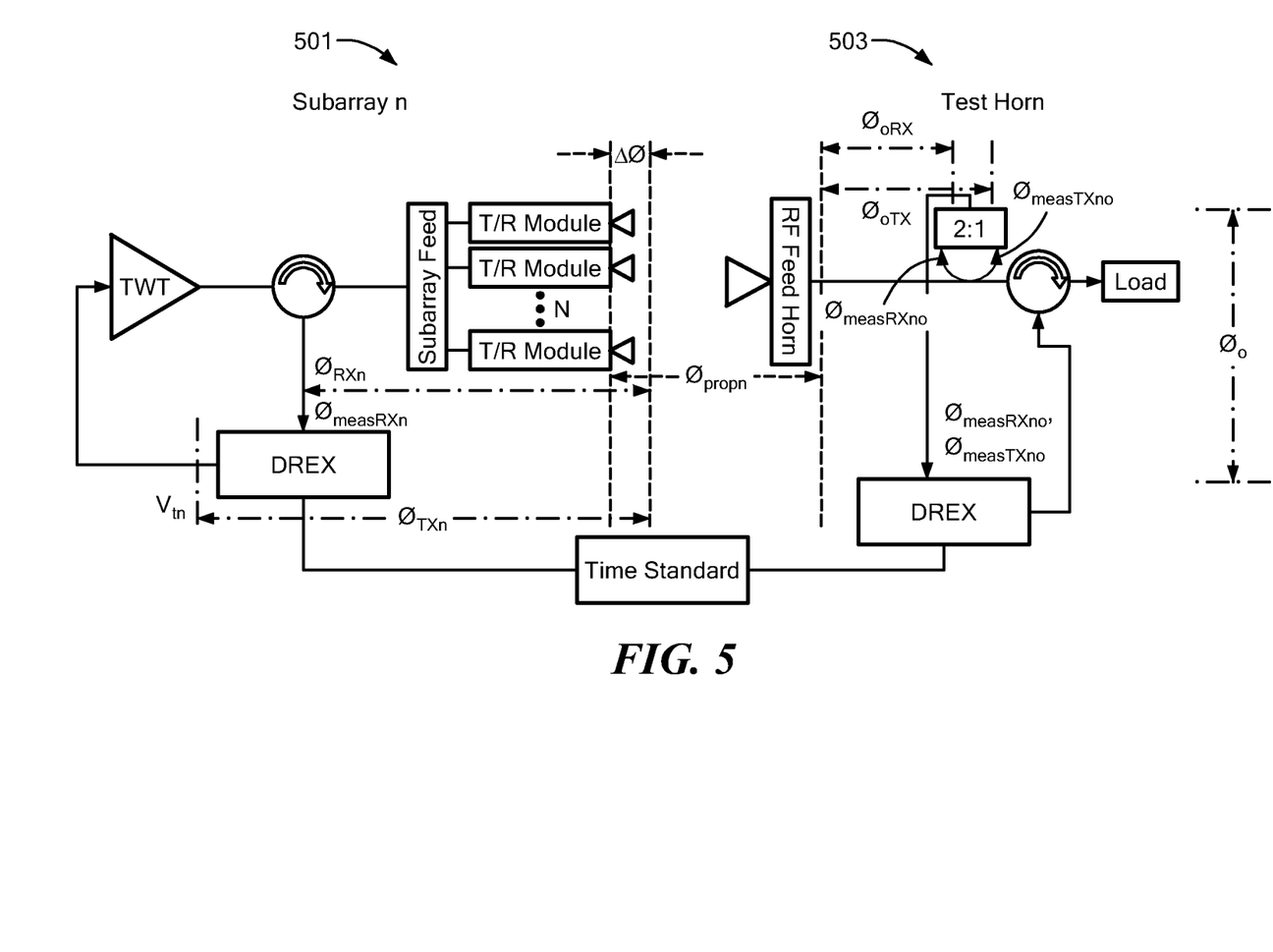
FIG. 5 is an illustration of an active array radar antenna being calibrated using a near field horn antenna and phase parameters according to the present disclosure.

Then, the at least one dish antenna n 401 is operated in RX mode. The active array antenna embodiment case is similar, as illustrated in FIG. 5 and described below. Then, $Ø_{measRXn}$ is determined by Equation (1) as follows, where all phases are known or measured, where $Ø_{measRXn}$ is a RF phase from a RF far field calibration source reference plane of the at least one radar antenna to an RX RF port of the at least one radar antenna measured during RX mode calibration, where $Ø_{measRXno}$ is a RF phase measured at a RF port of the at least one near field antenna during RX mode calibration, where $Ø_{propn}$ is a RF phase from a reference plane of the at least one radar antenna to the reference plane of the at least one near field antenna, and where $Ø_{oRX}$ is a RF phase from the reference plane of the at least one near field antenna to an RX RF port of the at least one near field antenna, and where $Ø_o$ is a RF phase on the at least one near field antenna to a digital receiver exciter (DREX) of the at least one radar antenna:

$$Ø_{measRXn} = Ø_{RXn} - \Delta Ø + Ø_{propn} + Ø_{oRX} + Ø_{measRXno} - Ø_o \qquad (1)$$

Then, the at least one dish antenna n 401 is operated in TX mode. Then, $Ø_{measTXno}$ is determined by Equation (2) as follows, assuming commanded phase=0 at TX port of dish antenna n, where $Ø_{measTXno}$ is a RF phase measured at a RF port of the at least one near field antenna during TX mode, where $Ø_{TXn}$ is a RF phase from a RF far field calibration source reference plane of the at least one radar antenna to a TX RF port of the at least one radar antenna in TX mode, where $Ø_{oTX}$ is a RF phase from the reference plane of the at least one near field antenna to an TX RF port of the at least one near field antenna, and where n is a positive integer that indicates one of the at least one radar antennas:

$$Ø_{measTXno} = Ø_{propn} + Ø_{oTX} + Ø_{TXn} - \Delta Ø + Ø_o; \qquad (2)$$

Then, $Ø_{measRXn} - Ø_{measTXno}$ is determined by Equation (3) as follows, where $\Delta Ø$ drops out, where $\Delta Ø$ is a RF phase difference between the RF far field calibration source reference plane and a reference plane of the at least one near field antenna, where $Ø_{measRXno}$ is a RF phase measured at the RF port of the at least one near field antenna during RX mode calibration, and where $Ø_{oTX}$ is a RF phase from the reference plane of the at least one near field antenna to an TX RF port of the at least one near field antenna:

$$\phi_{measRXn} - \phi_{measTXno} = \phi_{RXn} + (\phi_{oRX} - \phi_{oTX}) + \phi_{measRXno} - \phi_{TXn} - 2\phi_o \quad (3)$$

Then, $\varnothing_{TXn}$ is solved for from Equation (3) in Equation (4) as follows:

$$\phi_{TXn} = \qquad\qquad\qquad\qquad\qquad\qquad (4)$$
$$-\phi_{measRXn} + \phi_{measTXno} + \phi_{RXn} + (\phi_{oRX} - \phi_{oTX}) + \phi_{measRXno} - 2\phi_o$$

This determines the at least one dish antenna 401 $\varnothing_{TXn}$ to another of the at least one dish antenna 401 $\varnothing_{TXn}$ assuming that the same RF test horn (e.g., near field horn test vehicle) is used for all of the at least one dish antennas 401 or, if different RF test horns (e.g., different near field horn test vehicles) are used for calibrating some of the at least one dish antennas 401, the different RF test horns must be used to calibrate at least one common dish or radar antenna, where the change in ($\varnothing_{oRX}$–$\varnothing_{oTX}$–2$\varnothing_o$) for each RF test horn is then characterized relative to each other (e.g., $\varnothing_{1RX}$–$\varnothing_{1TX}$–2$\varnothing_1$ for a first horn, $\varnothing_{2RX}$–$\varnothing_{2TX}$–2$\varnothing_2$ for a second horn, . . . ). Thus, a single radar antenna array comprising all of the at least one dish antenna 401 may be calibrated with different RF horns.

FIG. 5 is an illustration of at least one active subarray or phased array n 501 being calibrated using at least one near field horn antenna 503 and phase parameters according to the present disclosure. The steps of the Near Field Horn method of determining TX phase of radar arrays for FIG. 5 is that same as that for FIG. 4 described above except for replacing the at least one dish antenna n 401 with the at least one active subarray n 501.

In the case of calibrating multiple phased array antennas, unlike in the reflector case, $-\Delta\varnothing+\varnothing_{propn}$ may be different for the TX and RX cases, due to T/R module errors and failures. These errors and failures may be different for TX relative to RX. An approximate error level may be estimated in Equation (5), where the first term represents phase errors on aperture and the second term represents sidelobe errors:

$$\Delta\phi \cong (\Delta\phi_{rmsRX}^2 + \Delta\phi_{rmsTX}^2)^{1/2}/N^{1/2} + \qquad (5)$$
$$\{[(1-P_e) + \Delta\phi_{rms}^2 + \delta_{rms}^2]/\eta N\}^{1/2}\Gamma_{ref}E_{horn}(\theta)\}$$

For example, for N=32, $\Delta\varnothing$=6°, $\delta$=0.1, $\Gamma_{ref}$=–3 dB, and $E_{horn}(\theta)$=–10 dB, $\Delta\varnothing$~1.8°. This level of calibration error is usually considered very small and acceptable for array calibration.

Figure 6:
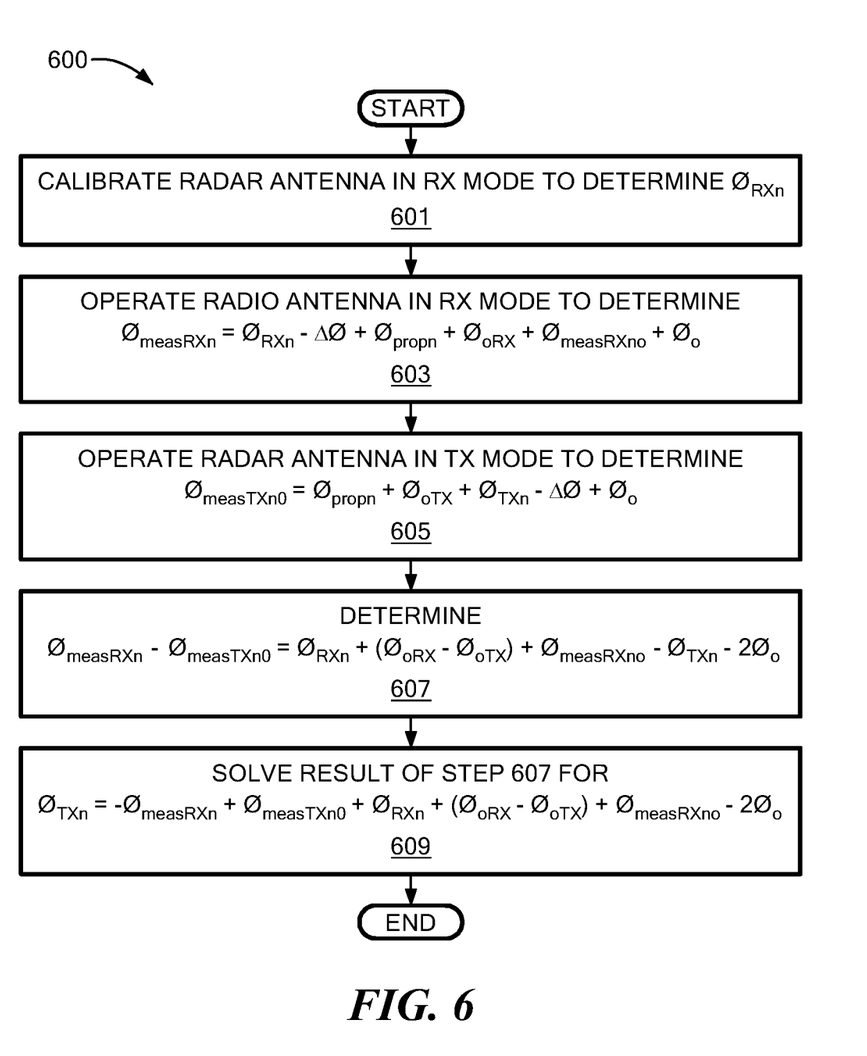
FIG. 6 is an exemplary method of calibrating a radar antenna using a near field antenna according to the present disclosure.

FIG. 6 is an exemplary method 600 of calibrating a radar antenna using a near field antenna according to the present disclosure.

Step 601 of the method 600 comprises calibrating the radar antenna (e.g., a dish antenna or an active array antenna) in RX mode to determine $\varnothing_{RXn}$. SatCal or any other suitable RX mode calibration method may be used.

Step 603 of the method 600 comprises operating the radar antenna 401 in RX mode. Then, $\varnothing_{measRXn}$ is determined by Equation (6) as follows, where all phases are known or measured:

$$\phi_{measRXn} = \phi_{RXn} - \Delta\phi + \phi_{propn} + \phi_{oRX} + \phi_{measRXno} - \phi_o \qquad (6)$$

Step 605 of the method 600 comprises operating the radar antenna in TX mode. Then, $\varnothing_{measTXno}$ is determined by Equation (7) as follows, assuming commanded phase=0 at TX port of dish antenna n:

$$\phi_{measTXno} = \phi_{propn} + \phi_{oTX} + \phi_{TXn} - \Delta\phi + \phi_o; \qquad (7)$$

Step 607 of the method 600 comprises determining $\varnothing_{measRXn}$–$\varnothing_{measTXno}$ by Equation (8) as follows, where $\Delta\varnothing$ drops out:

$$\phi_{measRXn} - \phi_{measTXno} = \phi_{RXn} + (\phi_{oRX} - \phi_{oTX}) + \phi_{measRXno} - \phi_{TXn} - 2\phi_o \quad (8)$$

Step 609 of the method 600 comprises solving Equation (8) for $\varnothing_{TXn}$ (e.g., TX mode calibration for the radar antenna) in Equation (9) as follows:

$$\phi_{TXn} = \qquad\qquad\qquad\qquad\qquad\qquad (9)$$
$$-\phi_{measRXn} + \phi_{measTXno} + \phi_{RXn} + (\phi_{oRX} - \phi_{oTX}) + \phi_{measRXno} - 2\phi_o$$

This determines the at least one dish antenna 401 $\varnothing_{TXn}$ to another of the at least one dish antenna 401 $\varnothing_{TXn}$ assuming that the same RF test horn (e.g., near field horn test vehicle) is used for all of the at least one dish antennas 401 or, if different RF test horns (e.g., different near field horn test vehicles) are used for calibrating some of the at least one dish antennas 401, the different RF test horns must be used to calibrate at least one common dish or radar antenna, where the quantity the change in ($\varnothing_{oRX}$–$\varnothing_{oTX}$–2$\varnothing_o$) for each RF test horn is then characterized relative to each other (e.g., $\varnothing_{1RX}\varnothing_{1TX}$–2$\varnothing_1$ for a first horn, $\varnothing_{2RX}$–$\varnothing_{2TX}$–2$\varnothing_2$ for a second horn, . . . ). Thus, a single radar antenna array comprising all of the at least one dish antenna 401 may be calibrated with different RF horns.

In the case of calibrating multiple phased array antennas, unlike in the reflector case, $-\Delta\varnothing+\varnothing_{propn}$ may be different for the TX and RX cases, due to T/R module errors and failures. These errors and failures may be different for TX relative to RX. An approximate error level may be estimated in Equation (10), where the first term represents phase errors on aperture and the second term represents sidelobe errors:

$$\Delta\phi \cong (\Delta\phi_{rmsRX}^2 + \Delta\phi_{rmsTX}^2)^{1/2}/N^{1/2} + \qquad (10)$$
$$\{[(1-P_e) + \Delta\phi_{rms}^2 + \delta_{rms}^2]/\eta N\}^{1/2}\Gamma_{ref}E_{horn}(\theta)\}$$

For example, for N=32, $\Delta\varnothing$=6°, $\delta$=0.1, $\Gamma_{ref}$=–3 dB, and $E_{horn}(\theta)$=–10 dB, $\Delta\varnothing$~1.8°. This level of calibration error is usually considered very small and acceptable for array calibration.

Possible errors in RF Horn Calibration may include RX calibration (e.g., SatCal), reflections inside the dish antenna network, and multipath errors. Any errors in RX calibration may not be cured by the RF Horn Calibration method and may be passed on to the TX calibration. By applying reciprocity to the phase shifts, it may be assumed that reflections are small. Assuming a 1.5:1 voltage standing wave ratio (VSWR) at a feed horn input and at a circulator output, resulting reflection error is approximately −28 dB or there may be a phase error of 2°. Multipath errors may impact the accuracy of an axial ratio calibration, for example, but not the relative TX to RX calibration of the horn antenna.

Figure 7:
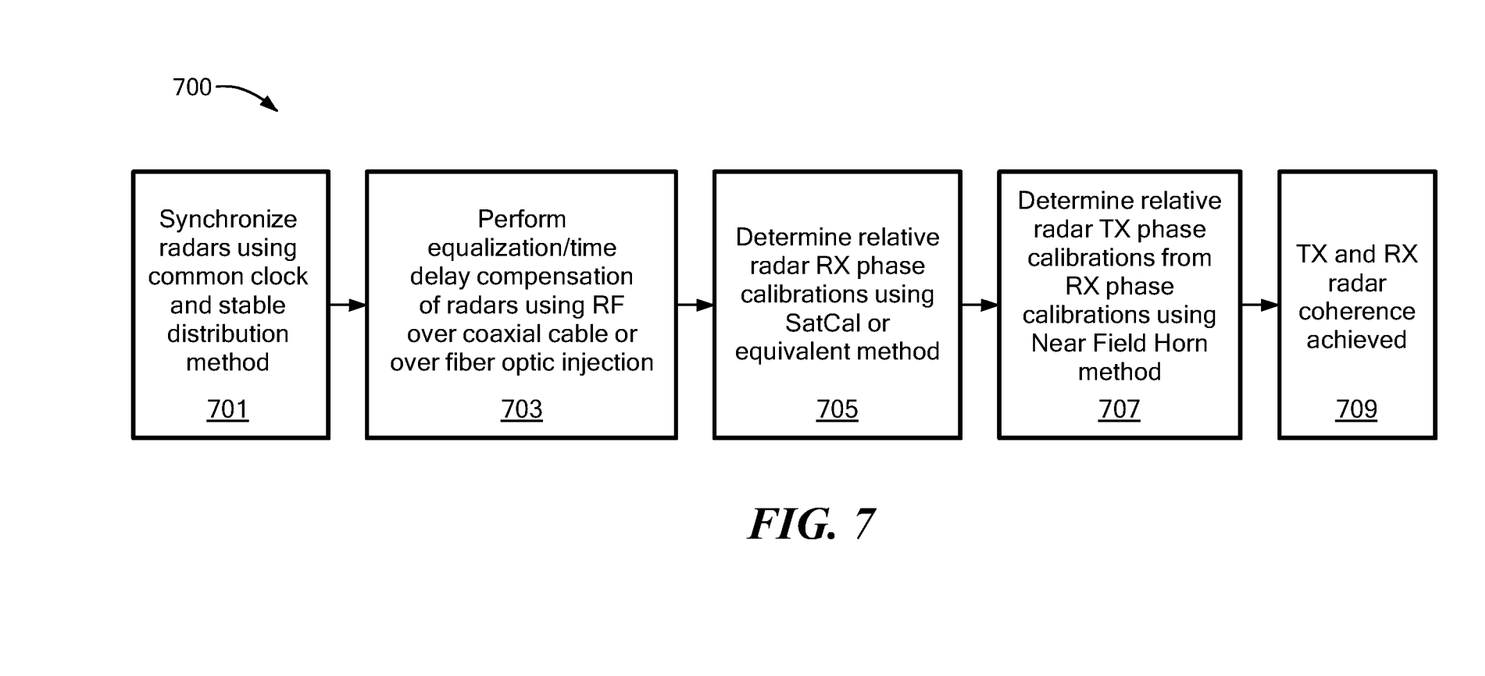
FIG. 7 is an exemplary method of synchronizing, equalizing, and calibrating a radar antenna using a near field antenna according to the present disclosure.

FIG. 7 is an exemplary method 700 of synchronizing, equalizing, and calibrating radar antennas using a near field antenna according to the present disclosure.

Step 701 of the method 700 comprises synchronizing radar antennas using a common clock signal and a stable distribution method. Step 703 of the method 700 comprises performing equalization/time delay compensation of the radar antennas using RF over coaxial cable or RF over fiber optic injection. Step 705 of the method 700 comprises determining relative radar antenna RX phase calibrations using SatCal or an equivalent method. Step 707 of the method 700 comprises determining relative radar antenna TX phase calibrations from the RX phase calibrations using a near field antenna method (e.g., the method illustrated in FIG. 6 and described above). Step 709 of the method 700 comprises achieving RX and TX radar antenna coherence, where step 705 provides RX radar antenna coherence and step 707 provides TX radar antenna coherence.

Step 707 need not be carried out after step 705 but may be executed prior to step 705 and at a different location, provided that the other calibration steps outlined above are followed, and provided that the phase stability of $\emptyset_{TXn}$-$\emptyset_{RXn}$ is maintained throughout the process.

Having described exemplary embodiments of the disclosure, it will now become apparent to one of ordinary skill in the art that other embodiments incorporating their concepts may also be used. The embodiments contained herein should not be limited to disclosed embodiments but rather should be limited only by the spirit and scope of the appended claims. All publications and references cited herein are expressly incorporated herein by reference in their entirety.

Elements of different embodiments described herein may be combined to form other embodiments not specifically set forth above. Various elements, which are described in the context of a single embodiment, may also be provided separately or in any suitable sub combination. Other embodiments not specifically described herein are also within the scope of the following claims.

Various embodiments of the concepts, systems, devices, structures and techniques sought to be protected are described herein with reference to the related drawings. Alternative embodiments can be devised without departing from the scope of the concepts, systems, devices, structures and techniques described herein.

It is noted that various connections and positional relationships (e.g., over, below, adjacent, etc.) are set forth between elements in the above description and in the drawings. These connections and/or positional relationships, unless specified otherwise, can be direct or indirect, and the described concepts, systems, devices, structures and techniques are not intended to be limiting in this respect. Accordingly, a coupling of entities can refer to either a direct or an indirect coupling, and a positional relationship between entities can be a direct or indirect positional relationship.

As an example of an indirect positional relationship, references in the present description to forming layer "A" over layer "B" include situations in which one or more intermediate layers (e.g., layer "C") is between layer "A" and layer "B" as long as the relevant characteristics and functionalities of layer "A" and layer "B" are not substantially changed by the intermediate layer(s). The following definitions and abbreviations are to be used for the interpretation of the claims and the specification. As used herein, the terms "comprises," "comprising, "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance, or illustration. Any embodiment or design described herein as "exemplary" is not necessarily to be construed as preferred or advantageous over other embodiments or designs. The terms "one or more" and "at least one" are understood to include any integer number greater than or equal to one, i.e., one, two, three, four, etc. The terms "a plurality" are understood to include any integer number greater than or equal to two, i.e., two, three, four, five, etc. The term "connection" can include an indirect "connection" and a direct "connection".

References in the specification to "one embodiment, "an embodiment," "an example embodiment," etc., indicate that the embodiment described can include a particular feature, structure, or characteristic, but every embodiment can include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

For purposes of the description herein, terms such as "upper," "lower," "right," "left," "vertical," "horizontal, "top," "bottom," (to name but a few examples) and derivatives thereof shall relate to the described structures and methods, as oriented in the drawing figures. The terms "overlying," "atop," "on top, "positioned on" or "positioned atop" mean that a first element, such as a first structure, is present on a second element, such as a second structure, where intervening elements such as an interface structure can be present between the first element and the second element. The term "direct contact" means that a first element, such as a first structure, and a second element, such as a second structure, are connected without any intermediary elements. Such terms are sometimes referred to as directional or positional terms.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

The terms "approximately" and "about" may be used to mean within ±20% of a target value in some embodiments, within ±10% of a target value in some embodiments, within ±5% of a target value in some embodiments, and yet within ±2% of a target value in some embodiments. The terms "approximately" and "about" may include the target value. The term "substantially equal" may be used to refer to values that are within ±20% of one another in some embodiments, within ±10% of one another in some embodiments, within ±5% of one another in some embodiments, and yet within ±2% of one another in some embodiments.

The term "substantially" may be used to refer to values that are within ±20% of a comparative measure in some embodiments, within ±10% in some embodiments, within ±5% in some embodiments, and yet within ±2% in some embodiments. For example, a first direction that is "substantially" perpendicular to a second direction may refer to a first direction that is within ±20% of making a 90° angle with the second direction in some embodiments, within ±10% of making a 90° angle with the second direction in some embodiments, within ±5% of making a 90° angle with the second direction in some embodiments, and yet within ±2% of making a 90° angle with the second direction in some embodiments.

It is to be understood that the disclosed subject matter is not limited in its application to the details of construction and to the arrangements of the components set forth in the following description or illustrated in the drawings. The disclosed subject matter is capable of other embodiments and of being practiced and carried out in various ways.

Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods, and systems for carrying out the several purposes of the disclosed subject matter. Therefore, the claims should be regarded as including such equivalent constructions insofar as they do not depart from the spirit and scope of the disclosed subject matter.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter.

What is claimed is:

1. A method of calibrating and cohering at least one radar antenna in receive (RX) mode and transmit (TX) mode, comprising:
   performing RX mode calibration on the at least one radar antenna using a radio frequency (RF) far field calibration source;
   determining a RF phase $\varnothing_{RXn}$ using the RF far field calibration source for each of the at least one radar antenna, where $\varnothing_{RXn}$ is a RF phase from a RF far field calibration source reference plane of the at least one radar antenna to a RX RF port of the at least one radar antenna in RX mode, and where n is a positive integer that indicates one of the at least one radar antenna;
   operating the at least one radar antenna in RX mode with at least one near field antenna to determine a plurality of RX mode phases in the at least one radar antenna and the at least one near field antenna, wherein the RX mode phases are RF phases measured during the RX mode using an RF port of the at least one radar antenna and an RF port of the at least one near field antenna;
   operating the at least one radar antenna in TX mode with the at least one near field antenna to determine a plurality of TX mode phases in the at least one radar antenna and the at least one near field antenna, wherein the TX mode phases are RF phases measured during the TX mode using the RF port of the at least one radar antenna and the RF port of the at least one near field antenna; and
   deriving TX mode calibration by combining the determined RX mode phases and the determined TX mode phases.

2. The method of claim 1, wherein the at least one radar antenna is one of at least one active array antenna and at least one dish antenna.

3. The method of claim 1, wherein the RF far field calibration source is a satellite.

4. The method of claim 1, wherein the at least one near field antenna is one of at least one horn antenna and at least one dish antenna.

5. The method of claim 1, wherein operating the at least one radar antenna in RX mode with the at least one near field antenna comprises operating the at least one radar antenna in RX mode with the at least one near field antenna to determine $\varnothing_{measRXn} = \varnothing_{RXn} - \Delta\varnothing + \varnothing_{propn} + \varnothing_{oRX} + \varnothing_{measRXno} - \varnothing_o$, where $\varnothing_{measRXn}$ is a RF phase from a RF far field calibration source reference plane of the at least one radar antenna to an RX RF port of the at least one radar antenna measured during RX mode calibration, where $\Delta\varnothing$ is a RF phase difference between the RF far field calibration source reference plane and a reference plane of the at least one near field antenna, where $\varnothing_{propn}$ is a RF phase from a reference plane of the at least one radar antenna to the reference plane of the at least one near field antenna, where $\varnothing_{oRX}$ is a RF phase from the reference plane of the at least one near field antenna to an RX RF port of the at least one near field antenna, where $\varnothing_{measRXno}$ is a RF phase measured at the RF port of the at least one near field antenna during calibration in the RX mode, where $\varnothing_o$ is a RF phase on the at least one near field antenna to a digital receiver exciter (DREX) of the at least one near field antenna, and where n is a positive integer that indicates one of the at least one radar antenna.

6. The method of claim 1, wherein operating the at least one radar antenna in TX mode with the at least one near field antenna comprises operating the at least one radar antenna in TX mode with the at least one near field antenna to determine $\varnothing_{measTXno} = \varnothing_{propn} + \varnothing_{oTX} + \varnothing_{TXn} - \Delta\varnothing + \varnothing_o$, where $\varnothing_{measTXno}$ is a RF phase measured at a RF port of the at least one near field antenna during calibration in the TX mode, where $\varnothing_{propn}$ is a RF phase from a reference plane of the at least one radar antenna to the reference plane of the at least one near field antenna, where $\varnothing_{oTX}$ is a RF phase from the reference plane of the at least one near field antenna to an TX RF port of the at least one near field antenna, where $\varnothing_{TXn}$ is a RF phase from a RF far field calibration source reference plane of the at least one radar antenna to a TX RF port of the at least one radar antenna in TX mode, where $\Delta\varnothing$ is a RF phase difference between the RF far field calibration source reference plane and a reference plane of the at least one near field antenna, where $\varnothing_o$ is a RF phase on the at least one near field antenna to a digital receiver exciter (DREX) of the at least one near field antenna, and where n is a positive integer that indicates one of the at least one radar antenna.

7. The method of claim 1, wherein deriving TX mode calibration by combining the determined RX mode phases and the determined TX mode phases comprises:

determining $\emptyset_{measRXn} - \emptyset_{measTXno} = \emptyset_{RXn} + (\emptyset_{oRX} - \emptyset_{oTX}) + \emptyset_{measRXno} - \emptyset_{TXn} - 2\emptyset_o$; and solving a result of $\emptyset_{measRXn} - \emptyset_{measTXno}$ to determine $\emptyset_{TXn} = -\emptyset_{measRXn} + \emptyset_{measTXno} + \emptyset_{RXn} + (\emptyset_{oRX} - \emptyset_{oTX}) + \emptyset_{measRXno} - 2\emptyset_o$, where $\emptyset_{measRXn}$ is a RF phase from a RF far field calibration source reference plane of the at least one radar antenna to an RX RF port of the at least one radar antenna measured during RX mode calibration, where $\emptyset_{measTXno}$ is a RF phase measured at a digital receiver exciter (DREX) RF port of the at least one near field antenna during calibration in the TX mode, where $\emptyset_{RXn}$ is a RF phase from a RF far field calibration source reference plane of the at least one radar antenna to a RX RF port of the at least one radar antenna in RX mode, where $\emptyset_{oRX}$ is a RF phase from the RF far field calibration source reference plane of the at least one near field antenna to an RX RF port of the at least one near field antenna, where $\emptyset_{oTX}$ is a RF phase from the RF far field calibration source reference plane of the at least one near field antenna to an TX RF port of the at least one near field antenna, where $\emptyset_{measRXno}$ is a RF phase measured at the DREX RF port of the at least one near field antenna during RX mode, where $\emptyset_{TXn}$ is a RF phase from a RF far field calibration source reference plane of the at least one radar antenna to a TX RF port of the at least one radar antenna in TX mode, and where $\emptyset_o$ is a RF phase on the at least one near field antenna to a digital receiver exciter (DREX) of the at least one near field antenna, and where n is a positive integer that indicates one of the at least one radar antenna.

8. The method of claim 1, wherein the at least one near field antenna comprises one near field antenna that is repositioned to calibrate and cohere each of the at least one radar antenna.

9. The method of claim 1, wherein the at least one near field antenna comprises at least one near field antenna for each of the at least one radar antenna.

10. The method of claim 1, further comprising calibrating and cohering the at least one radar antenna in receive (RX) mode and transmit (TX) mode for a plurality of different sky locations.

11. The method of claim 1, further comprising synchronizing the at least one radar antenna using a common clock signal and a stable distribution method.

12. The method of claim 1, further comprising performing equalization/time delay compensation of the at least one radar antenna using RF over coaxial cable.

13. The method of claim 1, further comprising performing equalization/time delay compensation of the at least one radar antenna using fiber optic injection.

14. A system for calibrating and cohering at least one radar antenna in receive (RX) mode and transmit (TX) mode, comprising:

at least one radar antenna;

a radio frequency (RF) far field calibration source configured to perform RX mode calibration on the at least one radar antenna and determine a RF phase $\emptyset_{RXn}$ using the RF far field calibration source for each of the at least one radar antenna, where $\emptyset_{RXn}$ is a RF phase from a RF far field calibration source reference plane of the at least one radar antenna to a RX RF port of the at least one radar antenna in RX mode, and where n is a positive integer that indicates one of the at least one radar antenna; and at least one near field antenna configured to operate the at least one radar antenna in RX mode to determine a plurality of RX mode phases in the at least one radar antenna and the at least one near field antenna, operate the at least one radar antenna in TX mode with the at least one near field antenna to determine a plurality of TX mode phases in the at least one radar antenna and the at least one near field antenna, and derive TX mode calibration by combining the determined RX mode phases and the determined TX mode phases, wherein the RX mode phases are RF phases measured during the RX mode using an RF port of the at least one radar antenna and an RF port of the at least one near field antenna, and wherein the TX mode phases are RF phases measured during the TX mode using the RF port of the at least one radar antenna and the RF port of the at least one near field antenna.

15. The system of claim 14, wherein the at least one radar antenna is one of at least one active array antenna and at least one dish antenna.

16. The system of claim 14, wherein the RF far field calibration source is a satellite.

17. The system of claim 14, wherein the at least one near field antenna is one of at least one horn antenna and at least one dish antenna.

18. The system of claim 14, wherein operating the at least one radar antenna in RX mode with the at least one near field antenna comprises operating the at least one radar antenna in RX mode with the at least one near field antenna to determine $\emptyset_{measRXn} = \emptyset_{RXn} - \Delta\emptyset + \emptyset_{propn} + \emptyset_{oRX} + \emptyset_{measRXno} - \emptyset_o$, where $\emptyset_{measRXn}$ is a RF phase from a RF far field calibration source reference plane of the at least one radar antenna to an RX RF port of the at least one radar antenna measured during RX mode calibration, where $\Delta\emptyset$ is a RF phase difference between the RF far field calibration source reference plane and a reference plane of the at least one near field antenna, where $\emptyset_{propn}$ is a RF phase from a reference plane of the at least one radar antenna to the reference plane of the at least one near field antenna, where $\emptyset_{oRX}$ is a RF phase from the reference plane of the at least one near field antenna to an RX RF port of the at least one near field antenna, where $\emptyset_{measRXno}$ is a RF phase measured at the RF port, wherein the RF port comprises a digital receiver exciter (DREX) RF port, of the at least one near field antenna during RX mode, where $\emptyset_o$ is a RF phase on a port of the at least one near field antenna to a DREX of the at least one near field antenna, and where n is a positive integer that indicates one of the at least one radar antenna.

19. The system of claim 14, wherein operating the at least one radar antenna in TX mode with the at least one near field antenna comprises operating the at least one radar antenna in TX mode with the at least one near field antenna to determine $\emptyset_{measTXno} = \emptyset_{propn} + \emptyset_{oTX} + \emptyset_{TXn} - \Delta\emptyset + \emptyset_o$, where $\emptyset_{measTXno}$ is a RF phase measured at a digital receiver exciter (DREX) RF port of the at least one near field antenna during calibration in the TX mode, where $\emptyset_{propn}$ is a RF phase from a reference plane of the at least one radar antenna to the reference plane of the at least one near field antenna, where $\emptyset_{oTX}$ is a RF phase from the reference plane of the at least one near field antenna to an TX RF port of the at least one near field antenna, where $\emptyset_{TXn}$ is a RF phase from a RF far field calibration source reference plane of the at least one radar antenna to a TX RF port of the at least one radar antenna in TX mode, where $\Delta\emptyset$ is a RF phase difference between the RF far field calibration source reference plane and a reference plane of the at least one near field antenna, where $\emptyset_o$ is a RF phase on a port of the at least one near field antenna to a digital receiver exciter (DREX) of the at least one near field antenna, and where n is a positive integer that indicates one of the at least one radar antenna.

20. The system of claim 14, wherein deriving TX mode calibration by combining the determined RX mode phases and the determined TX mode phases comprises:

determining $\emptyset_{measRXn} - \emptyset_{measTXno} = \emptyset_{RXn} + (\emptyset_{oRX} - \emptyset_{oTX}) + \emptyset_{measRXno} - \emptyset_{TXn} - 2\emptyset_o$; and solving a result of $\emptyset_{measRXn} - \emptyset_{measTXno}$ to determine $\emptyset_{TXn} = -\emptyset_{measRXn} + \emptyset_{measTXno} + \emptyset_{RXn} + (\emptyset_{oRX} - \emptyset_{oTX}) + \emptyset_{measRXno} - 2\emptyset_o$, where $\emptyset_{measRXn}$ is a RF phase from a RF far field calibration source reference plane of the at least one radar antenna to an RX RF port of the at least one radar antenna measured during RX mode calibration, where $\emptyset_{measTXno}$ is a RF phase measured at a digital receiver exciter (DREX) RF port of the at least one near field antenna during calibration in the TX mode, where $\emptyset_{RXn}$ is a RF phase from a RF far field calibration source reference plane of the at least one radar antenna to a RX RF port of the at least one radar antenna in RX mode, where $\emptyset_{oRX}$ is a RF phase from the RF far field calibration source reference plane of the at least one near field antenna to an RX RF port of the at least one near field antenna, where $\emptyset_{oTX}$ is a RF phase from the RF far field calibration source reference plane of the at least one near field antenna to an TX RF port of the at least one near field antenna, where $\emptyset_{measRXno}$ is a RF phase measured at the RF port of the at least one near field antenna during RX mode, where $\emptyset_{TXn}$ is a RF phase from a RF far field calibration source reference plane of the at least one radar antenna to a TX RF port of the at least one radar antenna in TX mode, and where $\emptyset_o$ is a RF phase on a port of the at least one near field antenna to a digital receiver exciter (DREX) of the at least one near field antenna, and where n is a positive integer that indicates one of the at least one radar antenna.

\* \* \* \* \*